(12) United States Patent
Lee

(10) Patent No.: US 8,131,111 B2
(45) Date of Patent: Mar. 6, 2012

(54) DEVICE OF PROCESSING DEAD PIXEL

(75) Inventor: Ho-Young Lee, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 882 days.

(21) Appl. No.: 12/159,385

(22) PCT Filed: Dec. 28, 2006

(86) PCT No.: PCT/KR2006/005844
§ 371 (c)(1),
(2), (4) Date: Jun. 26, 2008

(87) PCT Pub. No.: WO2007/075065
PCT Pub. Date: Jul. 5, 2007

(65) Prior Publication Data
US 2008/0298717 A1    Dec. 4, 2008

(30) Foreign Application Priority Data

Dec. 29, 2005  (KR) .................. 10-2005-0133563
Dec. 29, 2005  (KR) .................. 10-2005-0133602

(51) Int. Cl.
*G06K 9/40* (2006.01)
*H04N 9/64* (2006.01)
(52) U.S. Cl. ........................ 382/275; 348/243
(58) Field of Classification Search .................. None
See application file for complete search history.

(56) References Cited

U.S. PATENT DOCUMENTS

| 6,683,643 | B1* | 1/2004 | Takayama et al. | 348/247 |
| 2004/0150846 | A1 | 8/2004 | Jeong | |
| 2005/0276510 | A1* | 12/2005 | Bosco et al. | 382/275 |
| 2011/0079705 | A1* | 4/2011 | Tomaney et al. | 250/208.1 |

FOREIGN PATENT DOCUMENTS

| JP | 2000-217039 A | 8/2000 |
| JP | 2005-123946 A | 5/2005 |
| JP | 2005-341020 A | 12/2005 |

* cited by examiner

*Primary Examiner* — Randolph I Chu
(74) *Attorney, Agent, or Firm* — Birch, Stewart, Kolasch & Birch, LLP

(57) ABSTRACT

A dead pixel processing device is disclosed. The dead pixel processing device separates an inputted Bayer pattern image into corresponding component data; calculates the distribution (pattern) of pixels based on the median of each data; calculates a comparing value based on a component having a center pixel; outputs an external flag which informs whether there are a dead pixel and/or a hot pixel by using the comparing value; compares the values of the center pixel and adjacent pixels in the component having the center pixel; calculates a measuring value based on the center pixel; outputs an internal flag by using the measuring value; and corrects the dead pixel or the hot pixel. With the present invention, an image can be corrected by detecting a corresponding dead pixel and hot pixel.

16 Claims, 13 Drawing Sheets

Figure 12

Size3x3_Cj

| Size3x3_C1 | Size3x3_C2 | Size3x3_C3 |
|---|---|---|
| Size3x3_C4 | Size3x3_C5 | Size3x3_C6 |
| Size3x3_C7 | Size3x3_C8 | Size3x3_C9 |

DEVICE OF PROCESSING DEAD PIXEL

CROSS-REFERENCE TO RELATED APPLICATIONS

This application claims foreign priority benefits under 35 U.S.C. sctn. 119(a)-(d) to PCT/KR2006/005844, filed Dec. 28, 2006, which is hereby incorporated by reference in its entirety.

BACKGROUND

1. Technical Field

The present invention is related to a device of processing a dead pixel, more specifically to a device of processing a dead pixel for an image sensor.

2. Description of the Related Art

In an image sensor, a plurality of pixels are arranged in a two-dimensional structure. Each pixel converts inputted light to an electrical signal according to the luminance of the inputted light. The amount of the light inputted into each pixel can be recognized by measuring the converted electrical signal. By use of this, an image per unit pixel can be structured.

The image sensor consists of a pixel array having several hundred thousand to million pixels, a device converting analog data to digital data and several hundred to thousand storing device. There can be possibility of having an error during each pertinent process due to a large number of devices. The error causes generating a dead pixel or a hot pixel of pixels. The dead pixel becomes an important factor in the grade and pricing of the image sensor. The pixel data generated by the dead pixel is too larger or too smaller than the pixel data generated by adjacent pixels.

A conventional dead pixel processing method mainly compares a pixel with a reference pixel. If the difference between the pixel and the reference pixel is not within a predetermined range, the pixel is defined as the dead pixel and is corrected. However, the conventional dead pixel processing method uses a lot of hardware resources. In the case of a dense image or an image having high levels of the luminance difference, the difference between adjacent pixels has high levels. Accordingly, the conventional dead pixel processing method considers a proper pixel as the dead pixel in error and corrects the proper pixel. As a result, the recovered image has a lot of distortions as compared with a corresponding actual image.

SUMMARY

The present invention, which is designed to solve the above problems, provides a dead pixel processing device in order to determine whether a pixel is a dead pixel or a hot pixel by comparing the patterns of a component having a center pixel and other components in a 6×6 mask.

Also, the present invention provides a dead pixel processing device in order to output one pixel value corrected with a pertinent dead pixel.

Also, the present invention provides a dead pixel processing device in order to output a 6×6 pixel value corrected with a pertinent dead pixel.

Other objects of the present invention will become more easily understandable through the embodiments described below.

To achieve the above objects, according to an embodiment of the present invention, a dead pixel processing device includes a separating unit, separating an inputted Bayer pattern image into corresponding component data; and a comparing unit, calculating the distribution (pattern) of pixels based on the median of each data, calculating a comparing value based on a component having a center pixel, outputting an external flag which informs whether there are a dead pixel and/or a hot pixel by using the comparing value, comparing the values of the center pixel and adjacent pixels in the component having the center pixel; calculating a measuring value based on the center pixel; and outputting an internal flag by using the measuring value. Here, the dead pixel processing device can further include a correction unit outputting a pixel value corrected by using the external flag and the internal flag received from the comparing unit.

The correction unit outputs the median of the component data having the center pixel referring to the external flag and the internal flag if it is determined that there is the dead pixel/hot pixel. Also, the correction unit outputs the center pixel referring to the external flag and the internal flag if it is determined that there is no dead pixel/hot pixel.

The comparing unit has a center value detecting unit, detecting each of the medians of the component data; a first absolute value detecting unit, detecting the absolute value of a value of subtracting the median from each element; a difference detecting value, detecting a difference, that is, the absolute value of each value of subtracting the output data of the first absolute value detecting unit for component data, exclusive of the component data having the center pixel, from the output data of the first absolute value detecting unit for the component data having the center pixel; a comparing value detecting unit, summing the output of the difference detecting unit and detecting a comparing value of the component data per element; an external flag generation unit, comparing the comparing value with each of a dead pixel threshold and a hot pixel threshold and generating the external flag related to whether there are the dead pixel threshold and/or the hot pixel threshold; a second absolute value detecting unit, detecting the absolute value of a value of subtracting the center pixel value from each element of the component data having the center pixel; and an internal flag generating unit, setting a threshold for the internal flag by using a threshold for the illumination classification and the median of the component data and generating the internal flag by using the threshold.

The external flag generating unit sets the external flag as there is the dead pixel/hot pixel, in case that the comparing value of the center pixel only is larger than the dead pixel threshold when comparing the comparing value per element with the dead pixel threshold and, and/or in case that the comparing value of the center pixel only is larger than the hot pixel threshold when comparing the comparing value per element with the hot pixel threshold. Also the internal flag generating unit sums the medians of each component data; sets a threshold for the internal flag depending on the threshold; and sets the internal flag as there is the dead pixel/hot pixel in case that all absolute values per element, calculated by the second absolute detecting unit, are larger than the threshold for the internal flag.

According to another embodiment of the present invention, an image processor for an imaging device, which processes a dead pixel, includes a separating unit, separating an inputted Bayer pattern image into corresponding component data; a median detecting unit, detecting each median of the component data; a first absolute detecting unit, detecting the absolute value of subtracting the median from each element of the component data; a difference detecting value, detecting a difference, that is) the absolute value of each value of subtracting the output data of the first absolute value detecting unit for component data, exclusive of the component data having the center pixel, from the output data of the first absolute value detecting unit for the component data having the center pixel; a comparing value detecting unit, summing the output of the difference detecting unit and detecting a comparing value of the component data per element; an external flag generation unit, comparing the comparing value with each of a dead pixel threshold and a hot pixel threshold and generating the external flag related to whether there are the dead pixel threshold and/or the hot pixel threshold; a second absolute value detecting unit, detecting the absolute value of a value of subtracting the center pixel value from each element of the component data having the center pixel; and an internal flag generating unit, setting a threshold for the internal flag by using a threshold for the illumination classification and the median of the component data and generating the internal flag by using the threshold; and a correction unit, outputting a pixel value corrected by using the external flag and the internal flag, respectively, received from the external flag generation unit and internal flag generating unit.

According to another embodiment of the present invention, a dead pixel processing device, includes a separating unit, separating an inputted Bayer pattern image into corresponding component data; and a dead pixel detecting unit, calculating the distribution (pattern) of pixels based on the median of each data, comparing the patterns of other components; calculating a comparing value based on each component; comparing the comparing value with a dead pixel threshold; determining whether the corresponding pixel is the dead pixel; and outputting corrected component data The dead pixel detecting unit has a first center value detecting unit, detecting each of the medians of the component data; a first absolute value detecting unit, detecting the absolute value of a value of subtracting the median from each element; a first comparing unit, calculating each absolute value of a value of subtracting a first output from a second output of the first absolute value detecting unit; summing the absolute values; and detecting a comparing value per component and per data; a threshold setting unit, setting a threshold for the internal flag by using a threshold for the illumination classification and the median of the component data detected by the first median detecting unit; and a first output determining unit, comparing the comparing value, detected by the first comparing value detecting unit, with the dead pixel threshold and determining output data depending on whether there is the dead pixel.

Here, the first output determining unit compares the comparing value, detected by the first comparing value detecting unit, with the dead pixel threshold and outputs the component data if there is no comparing value that is larger than the dead pixel threshold. The first output determining unit compares the comparing value, detected by the first comparing value detecting unit, with the dead pixel threshold and determines each element of the component data if there is one comparing value threshold that is larger than the dead pixel threshold, whereas the first output determining unit compares the absolute value of a value of subtracting adjacent elements from a particular element with the threshold, determined by the threshold determining unit and determines the element as the median of the adjacent elements if all of the absolute values are larger than the threshold. The first output determining unit compares the comparing value, detected by the first comparing value detecting unit with the dead pixel threshold and determines each element of the component data if there is one comparing value that is larger than the dead pixel threshold, whereas the first output determining unit compares the absolute value of a value of subtracting adjacent elements from a particular element with the threshold, determined by the threshold determining unit and determines the pertinent element as the output if there is no absolute value that is larger than the threshold.

Preferably, the dead pixel processing device further has a hot pixel detecting unit calculating the distribution (pattern) from the component data received from the dead pixel detecting unit, calculating a comparing value based on each component; comparing the comparing value with a hot pixel threshold; determining whether the corresponding pixel is the hot pixel; and outputting corrected component data.

Here, the hot pixel detecting unit has a second center value detecting unit, detecting each of the medians of the component data received from the dead pixel detecting unit; a second absolute value detecting unit, detecting the absolute value of a value of subtracting the median, detected by the second median detecting unit, from each element; a second comparing unit, calculating each absolute value of a value of subtracting a first output from a second output of the second absolute value detecting unit; summing the absolute values; and detecting a comparing value per component and per data; and a second output determining unit, comparing the comparing value, detected by the second comparing value detecting unit, with the hot pixel threshold and determining output data depending on whether there is the hot pixel.

At this time, the second output determining unit compares the comparing value, detected by the second comparing value detecting unit, with the hot pixel threshold and outputs the component data if there is no comparing that is larger than the hot pixel threshold. The second output determining unit compares the comparing value, detected by the second comparing value detecting unit, with the hot pixel threshold and determines each element of the component data if there is one comparing value threshold that is larger than the hot pixel threshold, whereas the second output determining unit compares the absolute value of a value of subtracting adjacent elements from a particular element with the threshold, determined by the threshold determining unit and determines the element as the median of the adjacent elements if all of the absolute values are larger than the threshold. The second output determining unit compares the comparing value, detected by the second comparing value detecting unit, with the hot pixel threshold and determines each element of the component data if there is one comparing value threshold that is larger than the hot pixel threshold, whereas the second output determining unit compares the absolute value of a value of subtracting adjacent elements from a particular element with the threshold, determined by the threshold determining unit and determines the pertinent element as the output if there is no absolute value that is larger than the threshold.

BRIEF DESCRIPTION OF THE DRAWINGS

FIG. 12 is an example illustrating an image outputted from the dead pixel detecting unit of FIG. 9.

DETAILED DESCRIPTION

Figure 1:
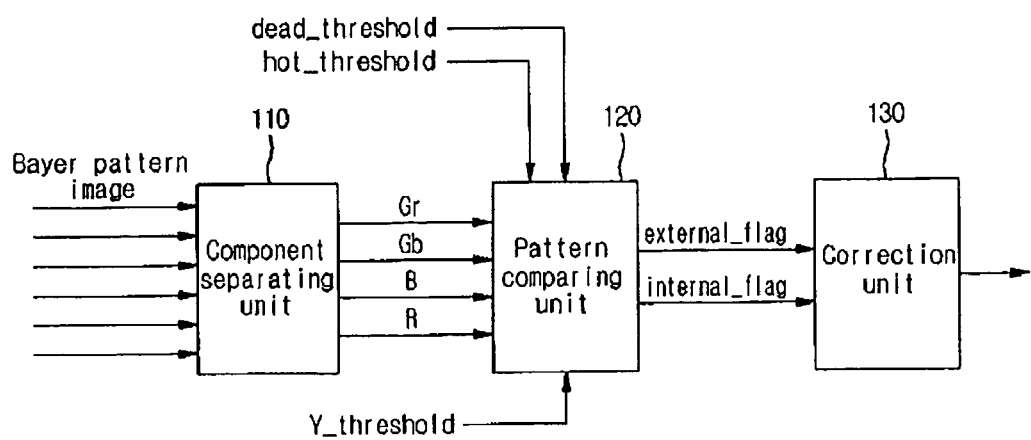
FIG. 1 is a block diagram illustrating an embodiment of a dead pixel processing device in accordance with a first embodiment of the present invention.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

FIG. is a block diagram illustrating an embodiment of a dead pixel processing device in accordance with a first embodiment of the present invention As illustrated FIG. 1, the dead pixel processing device can include a component separating unit 110, a pattern comparing unit 120 and a correction unit 130.

Figure 2:
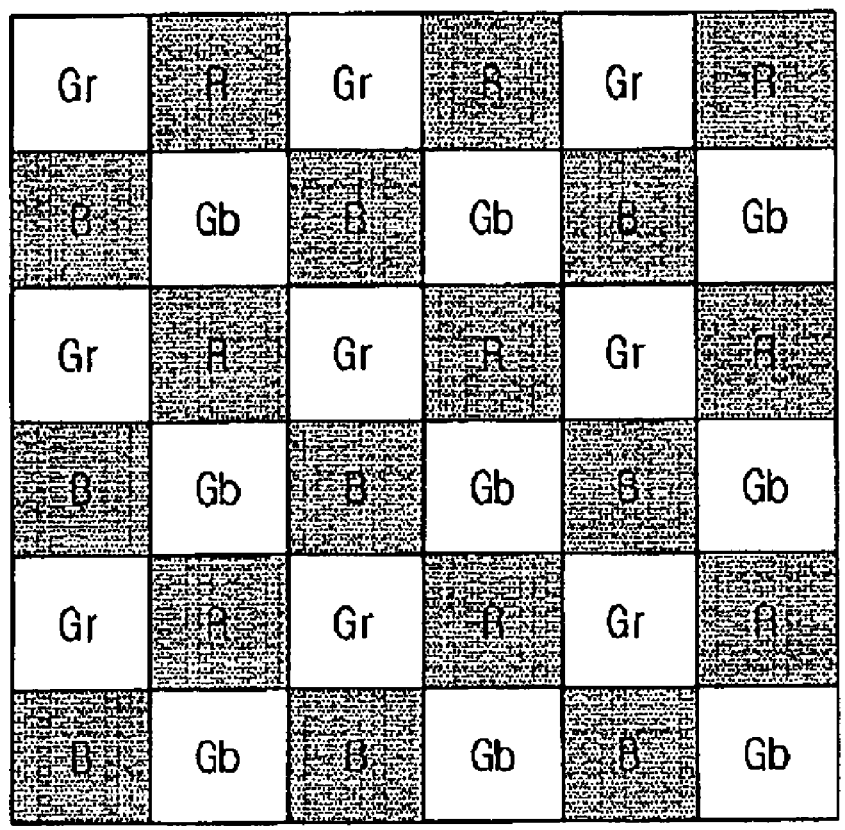
FIG. 2 is an example illustrating the inputted 6×6 Bayer pattern image of FIG. 1.
Figure 3:
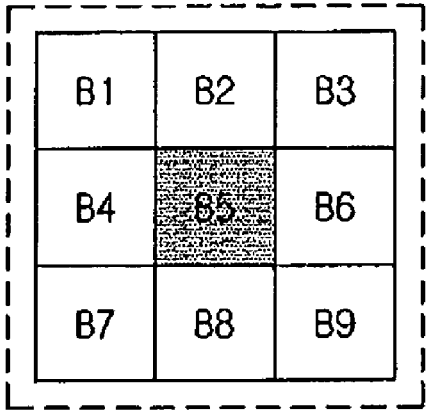
FIG. 3 is an example illustrating that the Bayer pattern image of FIG. 2 is separated into 3×3 components.

The component separating unit 110 separates an inputted 6×6 Bayer pattern image into four 3×3 components as illustrated in FIG. 3. FIG. 2 is an example illustrating the inputted 6×6 Bayer pattern image of FIG. 1, and FIG. 3 is an example illustrating that the Bayer pattern image of FIG. 2 is separated into the 3×3 components.

As illustrated in FIG. 2 and FIG. 3, the component separating unit 110 of the present invention separates the 6×6 Bayer pattern image into 3×3 data having only identical components, for example, red (R), green (G) of a GR line (Gr), G of a GB line (Gb) and blue (B) respectively.

Assuming that the "B5" of FIG. 3 is the center pixel of FIG. 2, the correction of the B5 will be described by way of example. Then, this example will be generalized.

The pattern comparing unit 120 calculates a pattern (the distribution of pixel values based on a median, hereinafter) of each component data; compares the patterns of a component having the center pixel and other components; calculates a measuring value based on the component having the center pixel; compares the center pixel and the corresponding adjacent pixel values; and calculates another measuring value based on the center pixel. This will be described in detail with reference to the pertinent drawings.

Figure 4:
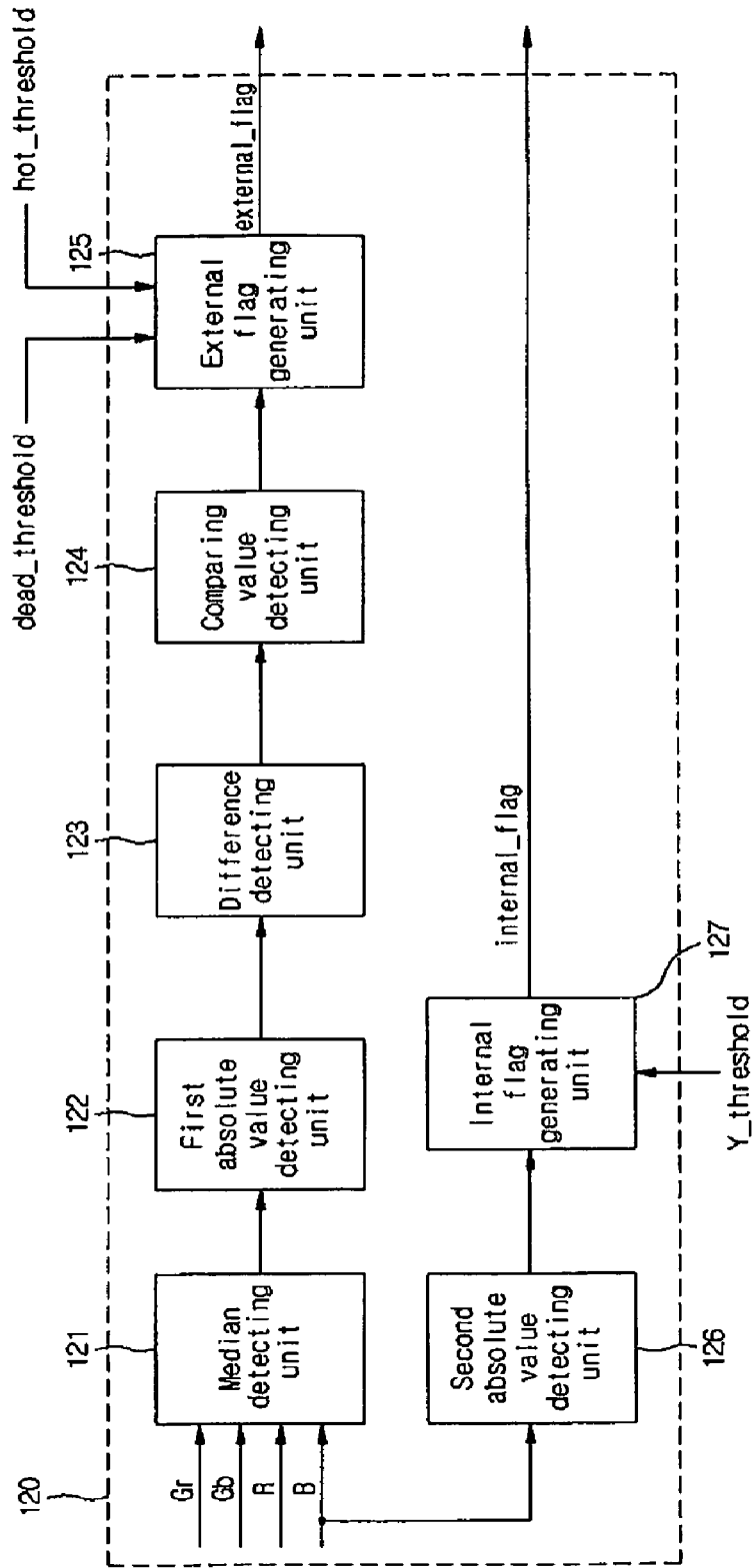
FIG. 4 is a detailed block diagram illustrating an embodiment of the pattern comparing unit of FIG. 1.

FIG. 4 is a detailed block diagram illustrating an embodiment of the pattern comparing unit of FIG. 1.

As illustrated in FIG. 4, the pattern comparing unit 120 can include a median detecting unit 121, a first absolute value detecting unit 122, a difference detecting unit 123, a comparing value detecting unit 124, an external flag generating unit 125, a second absolute value detecting unit 126 and an internal flag generating unit 127. Although the pertinent drawings represent the flow of signals as a line excluding input signals Gr, Gb, R and B, it is evident to those of ordinary skill in the art that various other data are included.

The median detecting unit 121 determines each median of the inputted 3×3 signals Gr, R, B and Gb, which refer to M1, M2, M3 and M4.

For example, in the case of the Gr, the first absolute value detecting unit 122 detects the absolute value Abs_Gri of a value of subtracting the M1 from each element Gri (i=1~9). For the R, B and Gb, similarly, the first absolute value detecting unit 122 detects the absolute values Abs_Ri, Abs_Bi and Abs_Gbi, respectively, of values of subtracting the M2, M3 and M4 from each element Ri, Bi and Gbi (i=1~9). The Abs_Gri, Abs_Ri, Abs_Bi and Abs_Gbi are calculated by the following formula 1.

$$Abs\_Gri = abs(Gri - M1)$$

$$Abs\_Ri = abs(Ri - M2)$$

$$Abs\_Bi = abs(Bi - M3)$$

$$Abs\_Gbi = abs(Gbi - M4) \quad i=1~9 \quad \text{[Formula 1]}$$

The difference detecting unit 123 detects the absolute values Diff1_i, Diff2_i and Diff3_i of values of subtracting the Abs_Gri, Abs_Ri and Abs_Gbi from the Abs_Bi, The Abs_Bi is output data of the first absolute value detecting unit 122 for the data B having the center pixel B5. The Abs_Gri, Abs_Ri and Abs_Gbi are output data of the first absolute value detecting unit 122 for the remaining data. This is represented by the following formula 2.

$$Diff1\_i = abs(Abs\_Bi - Abs\_Gri)$$

$$Diff2\_i = abs(Abs\_Bi - Abs\_Ri)$$

$$Diff3\_i = abs(Abs\_Bi - Abs\_Gbi) \quad \text{[Formula 2]}$$

The comparing value detecting unit 124 generates a value COMP_i of adding Diff1_i, Diff2_i and Diff3_i to generate an external flag. This is represented by the following formula 3.

$$COMP\_i = Diff1\_i + Diff2\_i + Diff3\_i \quad i=1\sim9 \quad \text{[Formula 3]}$$

Figure 5:
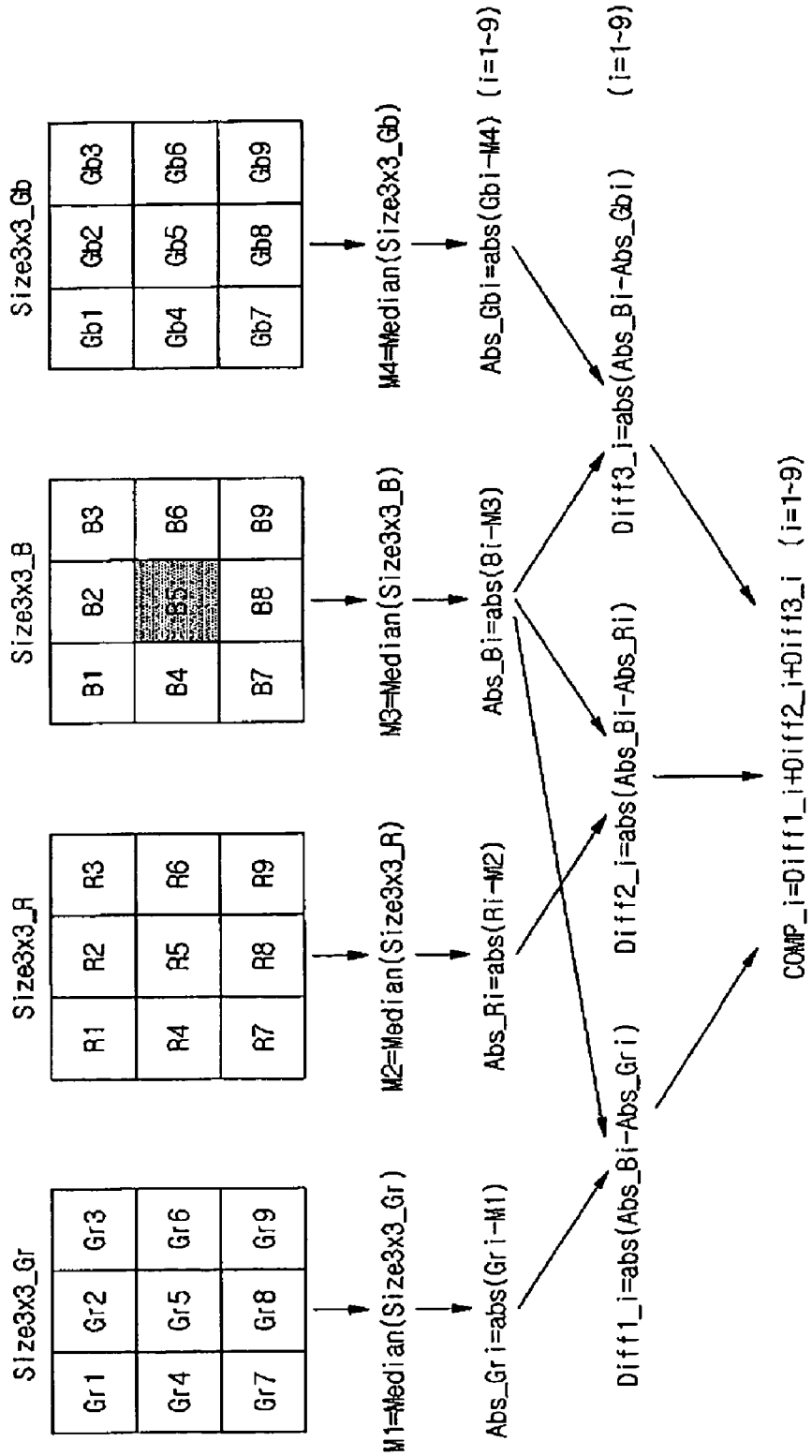
FIG. 5 is an example illustrating the operations of the median detecting unit, the first absolution value detecting unit, the difference detecting unit and the comparing value of FIG. 4.

FIG. 5 illustrates the aforementioned processes. FIG. 5 is an example illustrating the operations of the median detecting unit, the first absolution value detecting unit, the difference detecting unit and the comparing value of FIG. 4.

The external flag generating unit 125 compares the above-detected comparing value with a dead_threshold and a hot_threshold and generates a flag related to whether there are the dead pixel and the hot pixel. At this time, the dead_threshold and the hot_threshold are adjustable.

In other words, the external flag generating unit 125 compares the comparing value for each element with the dead_threshold. In case that there is a comparing value that is larger than the dead_threshold, if the i is 5 (that is, the comparing value for the center pixel is larger than the dead_threshold), the external flag generating unit 125 sets the flag dead_flag related to whether there are the dead pixel as 1. Otherwise, the flag dead_flag is zero.

Similarly, the external flag generating unit 125 compares the comparing value for each element with the hot_µthreshold. In case that there is a comparing value that is larger than the hot_threshold, if the i is 5 (that is, the comparing value for the center pixel is larger than the dead_threshold), the external flag generating unit 125 sets the flag hot_flag related to whether there are the hot pixel as 1. Otherwise, the flag hot_flag is zero.

Then, if the dead_flag or hot_flag is 1, the external flag generating unit 125 sets the external flag external_flag as 1. Otherwise (that is, in case that the dead_flag and the hot_flag are zero), the external flag generating unit 125 sets the external flag external_flag as zero to output it to the correction unit 130 of FIG. 1.

Figure 6:
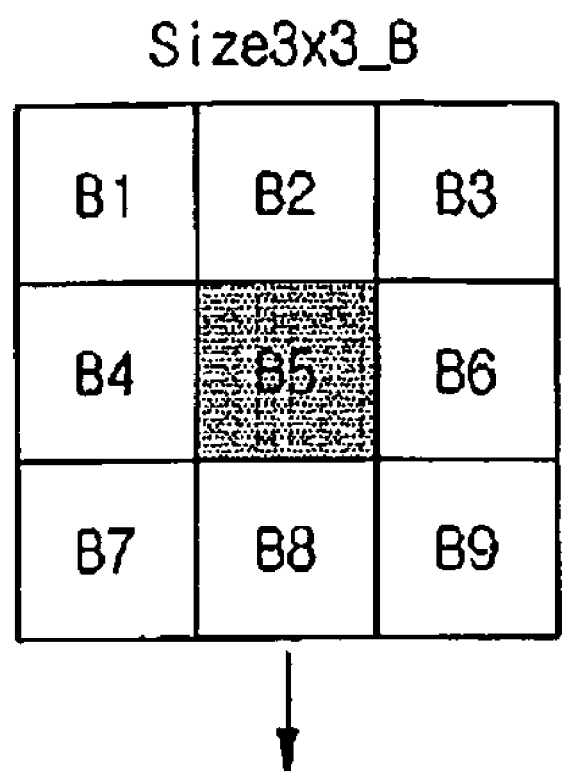
FIG. 6 is an example illustrating the operation of the second absolute value detecting unit of FIG. 4.

The second absolute value detecting unit 126 detects the absolute value Abs_Ci of a value of subtracting the center pixel value from each element (exclusive of B5) of the data B having the center pixel B5. This is represented by the following formula 4. Also, this is illustrated with FIG. 6. FIG. 6 is an example illustrating the operation of the second absolute value detecting unit of FIG. 4

$$Abs\_Ci = abs(Bi - B5) \; (i=1\sim9, \text{ exclusive of } 5) \quad \text{[Formula 4]}$$

The internal flag generating unit 127 sets a threshold thr for the internal flag by using a threshold Y_threshold for classifying the illumination applied thereto and the medians M1, M2, M3 and M4 of the 3×3 data. The internal flag generating unit 127 generates the internal flag by use of the threshold thr. The threshold Y_threshold is adjustable depending on the system.

When the arithmetic mean of the median id each component is defined as Y_m $$\left(\text{i.e. } Y\_m = \frac{M1 + M2 + M3 + M4}{4}\right),$$

if the Y_m is smaller than the Y_threshold, the internal flag generating unit 127 sets the thr as zero. Otherwise, the internal flag generating unit 127 sets the thr as 50. However, this is not limited to this case and the values are adjustable depending on the system. The internal flag generating unit 127 compares the set thr with the absolute value of each element, generated by the second absolute value detecting unit 126. If even any one of 8 values is smaller than the thr, the internal flag generating unit 127 sets the internal flag as zero. Otherwise, (i.e. each absolute values of all elements is larger than the thr), the internal flag generating unit 127 sets the internal flag as 1 to transfer it to the correction unit 130

If both the external flag and the internal flag are 1, the correction unit 130 outputs the median of the 3×3 data B. Otherwise, the correction unit 130 outputs the B5 as it is.

In other words, even though the above description assumes that the canter pixel is the B5 to correct the dead pixel, the present invention can be applied to the cases that the center pixel is any component.

Figure 7:
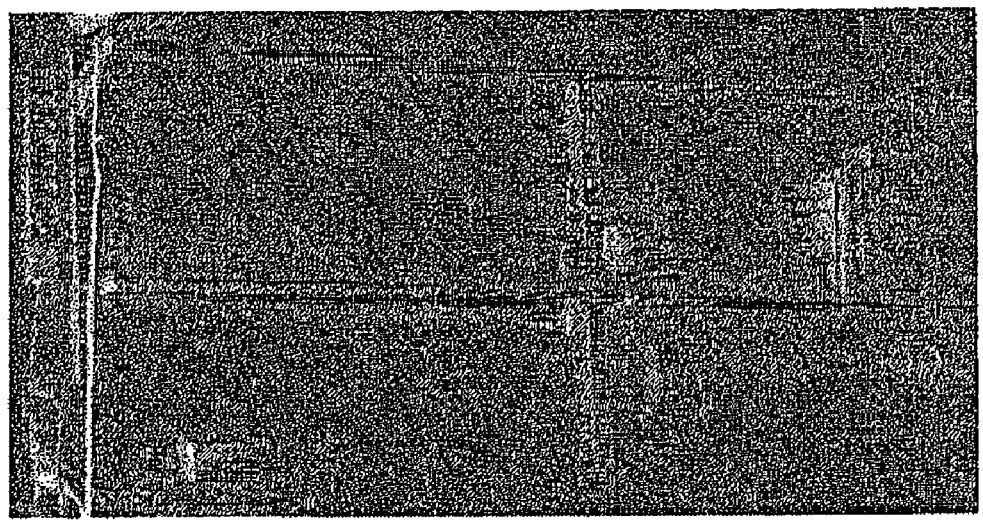
FIG. 7 is an example illustrating an original image inputted into a dead pixel processing device of the present invention.
Figure 8:
FIG. 8 is an example illustrating an image corrected by detecting the pertinent dead pixel in FIG. 7.

FIG. 7 is an example illustrating an original image inputted into the dead pixel processing device of the present invention, and FIG. 8 is an example illustrating an image corrected by detecting the pertinent dead pixel in FIG. 7.

As illustrated in FIG. 7 and FIG. 8, the dead pixel and the hot pixel are detected and corrected.

Figure 9:
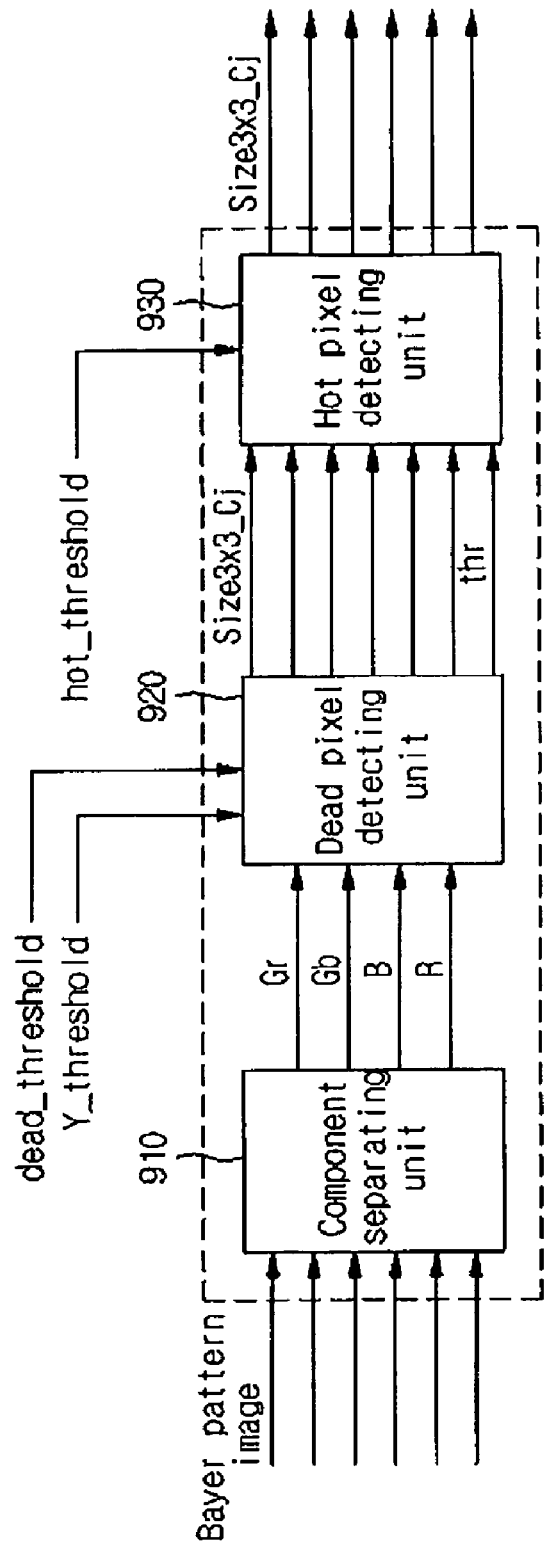
FIG. 9 is a block diagram illustrating an embodiment of a dead pixel processing device in accordance with a second embodiment of the present invention.

FIG. 9 is a block diagram illustrating an embodiment of the dead pixel processing device in accordance with a second embodiment of the present invention.

As illustrated in FIG. 9, the dead pixel processing device of the present invention can include a component separating unit 910, a dead pixel detecting unit 920 and a hot pixel detecting unit 930.

The component separating unit 910 separates an inputted 3×3 Bayer pattern image into four 3×3 components as illustrated in FIG. 3. As described above, FIG. 2 can be an embodiment of a 6×6 Bayer pattern image inputted into FIG. 9, and FIG. 3 is the example illustrating that the Bayer pattern image of FIG. 2 is separated into 3×3 components.

As illustrated in FIG. 2 and FIG. 3, the component separating unit 910 of the present invention separates the 6×6 Bayer pattern image into 3×3 data having only identical components, for example, red (R), green (G) of a GR line (Gr), G of a GB line (Gb) and blue (B) respectively. For convenience, as illustrated in FIG. 3, the 3×3 components of Gr, R, B and Gb refer to C1, C2, C3 and C4, respectively.

The dead pixel detecting unit 920 calculates a pattern (the distribution of pixel values based on a median, hereinafter) of each component data; compares the patterns other components; calculates a measuring value based on each component; and determines whether the pertinent pixel is the dead pixel by using the measuring value. This will be described in detail with reference to the pertinent drawings.

Figure 10:
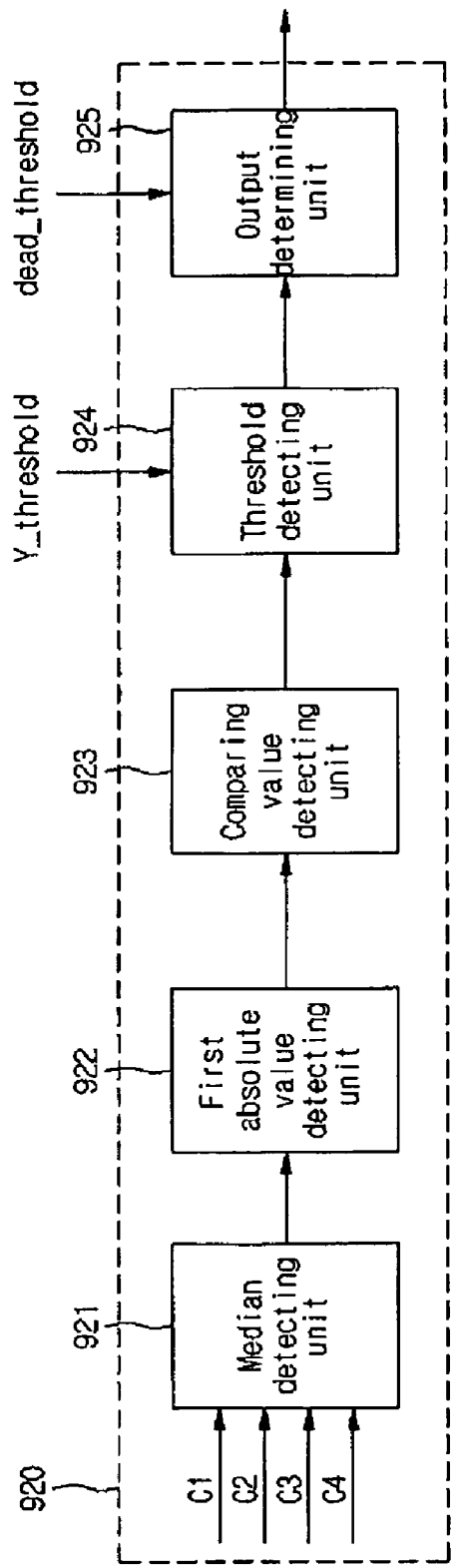
FIG. 10 is a detailed block diagram illustrating the dead pixel detecting unit of FIG. 9.

FIG. 10 is a detailed block diagram illustrating the dead pixel detecting unit of FIG. 9.

As illustrated in FIG. 10, the dead pixel detecting unit 920 can include a median detecting unit 921, an absolute value detecting unit 922, a comparing value detecting unit 923, a threshold setting unit 924 and an output determining unit 925. Although the pertinent drawings represent the flow of signals as a line excluding input signals C1, C2, C3 and C4, it is evident to those of ordinary skill in the art that various other data are included.

The median detecting unit 921 determines each median of the inputted 3×3 data C1, C2, C3 and C4, which refer to M1, M2, M3 and M4.

For example, in the case of the C1, the absolute value detecting unit 922 detects the absolute value Abs_1$i$ of a value of subtracting the M1 from each element C1$i$ (i=1~9). For the C2, C3 and C4, similarly, the first absolute value detecting unit 922 detects the absolute values Abs_2$i$, Abs_3$i$ and Abs_4$i$, respectively, of values of subtracting the M2, M3 and M4 from each element C2$i$, C3$i$ and C4$i$ (i=1~9). The Abs_1$i$, Abs_2$i$, Abs_3$i$ and Abs_4$i$ are calculated by the following formula 5.

$$Abs\_1i = abs(Gri-M1)$$

$$Abs\_2i = abs(Ri-M2)$$

$$Abs\_3i = abs(Bi-M3)$$

$$Abs\_4i = abs(Gbi-M4) \quad \text{[Formula 5]}$$

where i is a natural number between 1 and 9, inclusive.

Figure 11:
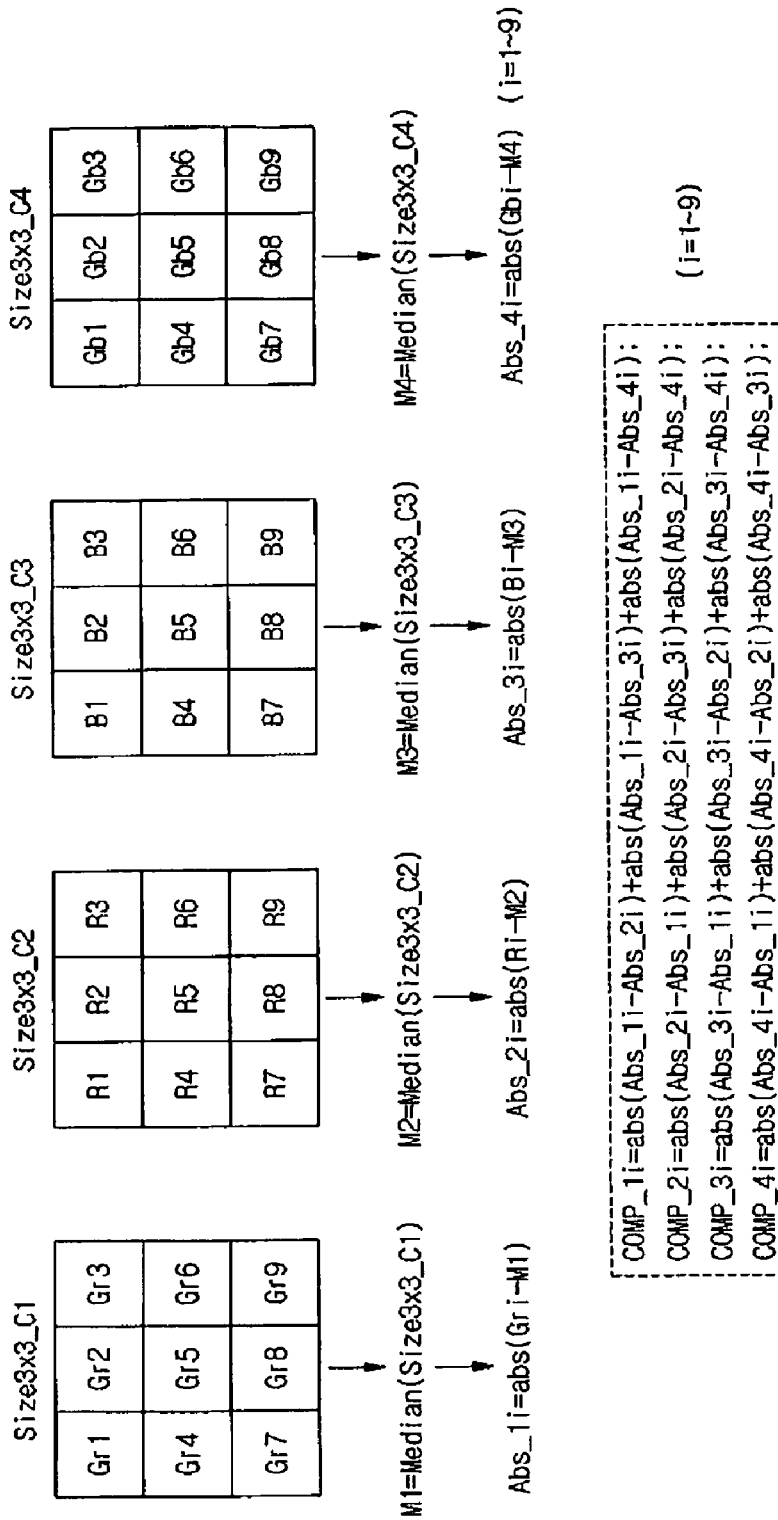
FIG. 11 is an example illustrating the operations of the median detecting unit, the absolute value detecting unit and the comparing value detecting value of FIG. 10.

The comparing value detecting unit 923 calculates the absolute value of a value of subtracting from one, the others of each output data, calculated from the absolute value detecting unit 922, and sums the absolute values to calculate the comparing value. In other words, the comparing value detecting unit 923 calculates each absolute value of a value of subtracting the Abs_2$i$, Abs_3$i$ and Abs_4$i$ from the Abs_1$i$ and sums the absolute values. Similarly, the comparing value detecting unit 923 calculates COMP_2$i$, COMP_3$i$ and COMP_4$i$. This is represented by the following formula 6.

$$COMP\_1i = abs(Abs\_1i-Abs\_2i) - abs(Abs\_1i-Abs\_3i) + abs(Abs\_1i-Abs\_4i)$$

$$COMP\_2i = abs(Abs\_2i-Abs\_1i) - abs(Abs\_2i-Abs\_3i) + abs(Abs\_2i-Abs\_4i)$$

$$COMP\_3i = abs(Abs\_3i-Abs\_1i) - abs(Abs\_3i-Abs\_2i) + abs(Abs\_3i-Abs\_4i)$$

$$COMP\_4i = abs(Abs\_4i-Abs\_1i) - abs(Abs\_4i-Abs\_2i) + abs(Abs\_4i-Abs\_3i) \quad \text{[Formula 6]}$$

where i is a natural number between 1 and 9, inclusive. FIG. 11 is an example illustrating the operations of the median detecting unit, the absolute value detecting unit and the comparing value detecting value of FIG. 10.

The threshold setting unit 924 sets a threshold thr for the internal flag by using a threshold Y_threshold for classifying the illumination applied thereto and the medians M1, M2, M3 and M4 of the 3×3 data. The threshold setting unit 924 generates the internal flag by use of the threshold thr. The threshold Y_threshold is adjustable depending on the system. When the arithmetic mean of the median id each component is defined as Y_m $$\left(\text{i.e. } Y\_m = \frac{M1+M2+M3+M4}{4}\right),$$

if the Y_m is smaller than the Y_threshold, the threshold setting unit 924 sets the thr as zero. Otherwise, the threshold setting unit 924 sets the thr as 50. However, this is not limited to this case and the values are adjustable depending on the system.

The output determining unit 925 compares each of 4 comparing values, detected by the above comparing value detecting unit 923 with an applied dead_threshold. If there is no comparing value that is larger than the dead_threshold, an original image is outputted. In other words, a 3×3 image Cj (j=1~4) as it is. FIG. 12 is an example illustrating the image outputted from the dead pixel detecting unit of FIG. 9. As illustrated in FIG. 12, the dead pixel detecting unit 920 outputs the 3×3 image Cj (j=1~4). Accordingly, the data outputted from the output determining unit 925 is the original 6×6 image. In FIG. 12, "size3×3_Cj1" refers to a first element of 3×3 data Cj. The below description will use the 3×3 data Cj.

If there is one element only that is larger than the dead_threshold, the output determining unit 925 generates the image again by making up the pixels per element.

To make up data Size3×3_Cj1 (a first element of 3×3 data Cj, j=1~4), the output determining unit 925 compares each absolute value of a value of subtracting adjacent elements (i.e. other data Size3×3_Cj2, Size3×3_Cj5 and Size3×3_Cj4 in FIG. 12) from the data Size3×3_Cj1 (i.e. the first element) with the threshold thr. If there is even any one that is smaller than the thr, the data Size3×3_Cj1 is outputted. Otherwise, the medians of the other data Size3×3_Cj2, Size3×3_Cj5 and Size3×3_Cj4 are outputted.

Also, to make up data Size3×3_Cj2 (a second element of 3×3 data Cj, j=1~4), the output determining unit 925 compares each absolute value of a value of subtracting adjacent elements (i.e. other data Size3×3_Cj1, Size3×3_Cj3, Size3×3_Cj4, Size3×3_Cj5 and Size3×3_Cj6 in FIG. 12) from the data Size3×3_Cj2 (i.e. the second element) with the threshold thr. If there is even any one that is smaller than the thr, the data Size3×3_Cj2 is outputted. Otherwise, the medians of the other data Size3×3_Cj1, Size3×3_Cj3, Size3×3_Cj4, Size3×3_Cj5 and Size3×3_Cj6 are outputted. As such, each output value of all elements of the data Size3×3_Cj (j=1~4) is determined to be transferred to the hot pixel determining unit 930 of FIG. 9.

The hot pixel determining unit 930 calculates the pattern of each component and then calculates a measuring value based on comparing the patterns of other components. The hot pixel determining unit 930 determines whether the corresponding pixel is the hot pixel by using this measuring value. Hereinafter, the hot pixel determining unit 930 will be described in detail with reference to the pertinent drawing.

Figure 13:
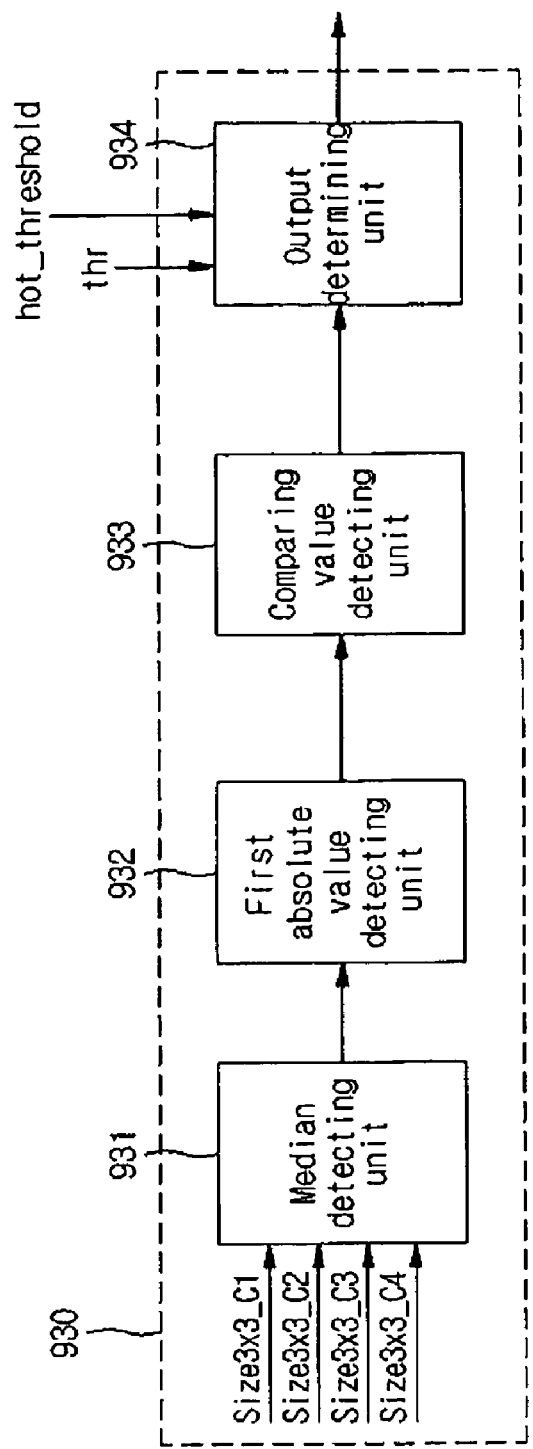
FIG. 13 is a detailed block diagram illustrating an embodiment of the hot pixel detecting unit of FIG. 9.

FIG. 13 is a detailed block diagram illustrating an embodiment of the hot pixel detecting unit of FIG. 9.

As illustrated in FIG. 13, the hot pixel detecting unit 930 can include a median detecting unit 931, an absolute value detecting unit 932, a comparing value detecting unit 933 and an output determining unit 934. Although the pertinent drawings represent the flow of signals as a line excluding input signals Size3×3C1, Size3×3C2, Size3×3C3 and Size3×3C4, it is evident to those of ordinary skill in the art that various other data are included.

The median detecting unit 931 determines each median of the inputted 3×3 data C1, C2, C3 and C4, which refer to M5, M6, M7 and M8. However, the medians M5, M6, M7 and M8 detected by the median detecting unit 931 can be the same as the medians detected by the median detecting unit 921 of the dead pixel detecting unit 920 of FIG. 10.

For example, in the case of the Size3×3C1, the absolute value detecting unit 932 detects the absolute value Abs_5$i$ of a value of subtracting the M5 from each element Size3×3C1 (i=19). For the Size3×3C2$i$, Size3×3C3$i$ and Size3×3C4$i$, similarly, the first absolute value detecting unit 932 detects the absolute values Abs_6$i$, Abs_7$i$ and Abs_8$i$, respectively, of values of subtracting the M6, M7 and M8 from each element Size3×3C2$i$, Size3×3C3$i$ and Size3×3C4$i$ (i=19). The Abs_5$i$, Abs_6$i$, Abs_7$i$ and Abs_8$i$ are calculated by the following formula 7.

$$Abs\_5i = abs(Size3\times3C1i - M5)$$

$$Abs\_6i = abs(Size3\times3C1i - M6)$$

$$Abs\_7i = abs(Size3\times3C1i - M7)$$

$$Abs\_8i = abs(Size3\times3C1i - M8) \quad \text{[Formula 7]}$$

where i is a natural number between 1 and 9, inclusive.

The comparing value detecting unit 933 calculates the absolute value of a value of subtracting from one, the others of each output data, calculated from the absolute value detecting unit 932, and sums the absolute values to calculate the comparing value. In other words, the comparing value detecting unit 933 calculates each absolute value of a value of subtracting the Abs_6$i$, Abs_7$i$ and Abs_8$i$ from the Abs_5$i$ and sums the absolute values. Similarly, the comparing value detecting unit 933 calculates COMP_6$i$, COMP_7$i$ and COMP_8$i$. This is represented by the following formula 8.

$$COMP\_5i = abs(Abs\_5i - Abs\_6i) + abs(Abs\_5i - Abs\_7i) - abs(Abs\_5i - Abs\_8i)$$

$$COMP\_6i = abs(Abs\_6i - Abs\_5i) + abs(Abs\_6i - Abs\_7i) + abs(Abs\_6i - Abs\_8i)$$

$$COMP\_7i = abs(Abs\_7i - Abs\_5i) + abs(Abs\_7i - Abs\_6i) + abs(Abs\_7i - Abs\_8i)$$

$$COMP\_8i = abs(Abs\_8i - Abs\_5i) + abs(Abs\_8i - Abs\_6i) + abs(Abs\_8i - Abs\_7i) \quad \text{[Formula 8]}$$

where i is a natural number between 1 and 9, inclusive.

The output determining unit 934 compares each of 4 comparing values, detected by the above comparing value detecting unit 933 with an applied hot_threshold. If there is no comparing value that is larger than the hot_threshold, an original image is outputted. In other words, a 3×3 image Cj (j=1~4) as it is. Accordingly, the data outputted from the output determining unit 934 is the original 6×6 image.

If there is one element only that is larger than the dead_threshold, the output determining unit 934 generates the image again by making up the pixels per element.

To make up data Size3×3_Cj1 (a first element of 3×3 data Cj, j=1~4), the output determining unit 934 compares each absolute value of a value of subtracting adjacent elements (i.e. other data Size3×3_Cj2, Size3×3_Cj5 and Size3×3_Cj4 in FIG. 12) from the data Size3×3_Cj1 (i.e. the first element) with the threshold thr, determined and transferred by the threshold determining unit 924 of the threshold unit 920. If there is even any one that is smaller than the thr, the data Size3×3_Cj1 is outputted. Otherwise, the medians of the other data Size3×3_Cj2, Size3×3_Cj5 and Size3×3_Cj4 are outputted.

Also, to make up data Size3×3_Cj2 (a second element of 3×3 data Cj, j=1~4), the output determining unit 925 compares each absolute value of a value of subtracting adjacent elements (i.e. other data Size3×3_Cj1, Size3×3_Cj3, Size3×3_Cj4, Size3×3_Cj5 and Size3×3_Cj6 in FIG. 12) from the data Size3×3_Cj2 (i.e. the second element) with the threshold thr. If there is even any one that is smaller than the thr, the data Size3×3_Cj2 is outputted. Otherwise, the medians of the other data Size3×3_Cj1, Size3×3_Cj3, Size3×3_Cj4, Size3×3_Cj5 and Size3×3_Cj6 are outputted. As such, each output value of all elements of the data Size3×3_Cj (j=1~4) can be determined to output the data Size3×3_Cj (j=1~4). Accordingly, 6×6 data is outputted.

As described above, FIG. 7 can be the example illustrating an original image inputted into the dead pixel processing device of the present invention, and FIG. 8 can be the example illustrating an image corrected by detecting the pertinent dead pixel in FIG. 7. Since the second embodiment can provide the same or similar image as the first embodiment of the present invention, the pertinent description or drawings will be omitted.

In other words, as illustrated in the pertinent drawings, an image can be corrected by detecting a corresponding dead pixel and hot pixel.

As described above, the present invention can exactly determine whether a pixel is a dead pixel or a hot pixel by comparing the patterns of a component having a center pixel and other components in a 6×6 mask and output a corresponding corrected image of 1 pixel.

Also, the present invention can exactly determine whether a pixel is a dead pixel or a hot pixel by comparing the patterns of a component having a center pixel and other components in a 6×6 mask and output a 6×6 pixel value corrected with a pertinent dead pixel.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A dead pixel processing device, comprising:
a separating unit configured to separate an inputted Bayer pattern image into corresponding component data; and
a comparing unit configured to calculate a distribution (pattern) of pixels based on a median of each component data, calculate a comparing value based on a component data having a predetermined center pixel, output an external flag which informs whether there is at least one of a dead pixel and a hot pixel by using the comparing value, compares values of the predetermined center pixel and adjacent pixels in the component data having the predetermined center pixel, calculate a measuring value based on the predetermined center pixel, and output an internal flag by using the measuring value,
wherein the comparing unit comprises a center value detecting unit configured to detect each of the medians of the component data;
a first absolute value detecting unit configured to detect the absolute value of a value of subtracting the median from each element of the component data;
a difference detecting unit configured to detect a difference which is an absolute value of each value of subtracting an output data of the first absolute value detecting unit for the component data, exclusive of the component data having the predetermined center pixel, from an output data of the first absolute value detecting unit for the component data having the predetermined center pixel;
a comparing value detecting unit configured to sum the output of the difference detecting unit and detect a comparing value of the component data per element of the component data;
an external flag generation unit configured to compare the comparing value with each of a dead pixel threshold and a hot pixel threshold and generate the external flag related to whether there is at least one of a dead pixel and a hot pixel;

a second absolute value detecting unit configured to detect an absolute value of a value of subtracting a center pixel value from each element of the component data having the predetermined center pixel; and an internal flag generating unit configured to set a threshold for the internal flag by using a threshold for an illumination classification and the median of the component data and generate the internal flag by using the threshold.

2. The dead pixel processing device of claim 1, further comprising a correction unit configured to output pixel data of one pixel corrected by using the external flag and the internal flag received from the comparing unit.

3. The dead pixel processing device of claim 2, wherein the correction unit outputs the median of the component data having the predetermined center pixel referring to the external flag and the internal flag if it is determined that there is at least one of the dead pixel and the hot pixel.

4. The dead pixel processing device of claim 2, wherein the correction unit outputs the predetermined center pixel referring to the external flag and the internal flag if it is determined that there is no dead or hot pixel.

5. The dead pixel processing device of claim 1, wherein the external flag generating unit sets the external flag as there being the dead pixel or the hot pixel when the comparing value of the center pixel only is larger than the dead pixel threshold when comparing the comparing value per element of the component data with the dead pixel threshold and or when the comparing value of the center pixel only is larger than the hot pixel threshold when comparing the comparing value per element of the component data with the hot pixel threshold.

6. The dead pixel processing device of claim 1, wherein the internal flag generating unit sums the medians of each component data; sets a threshold for the internal flag depending on the threshold; and sets the internal flag as there being the dead pixel or the pixel when all absolute values per element of the component data, calculated by the second absolute detecting unit, are larger than the threshold for the internal flag.

7. An image processor for an imaging device, which processes a dead pixel, the image processor comprising:
a separating unit configured to separate an inputted Bayer pattern image into corresponding component data;
a median detecting unit configured to detect each median of the component data;
a first absolute detecting unit configured to detect the absolute value of subtracting the median from each element of the component data;
a difference detecting unit configured to detect a difference, which is an absolute value of each value of subtracting an output data of the first absolute value detecting unit for the component data, exclusive of the component data having a predetermined center pixel, from an output data of the first absolute value detecting unit for the component data having the predetermined center pixel;
a comparing value detecting unit configured to sum the output of the difference detecting unit and detect a comparing value of the component data per element of the component data;
an external flag generation unit configured to compare the comparing value with each of a dead pixel threshold and a hot pixel threshold and generate the external flag related to whether there is at least one of a dead pixel and a hot pixel;
a second absolute value detecting unit configured to detect an absolute value of a value of subtracting a center pixel value from each element of the component data having the predetermined center pixel; and
an internal flag generating unit configured to set a threshold for the internal flag by using a threshold for an illumination classification and the median of the component data and generate the internal flag by using the threshold; and
a correction unit configured to output a pixel value corrected by using the external flag and the internal flag, respectively, received from the external flag generation unit and internal flag generating unit.

8. A dead pixel processing device, comprising:
a separating unit configured to separate an inputted Bayer pattern image into corresponding component data; and
a dead pixel detecting unit configured to calculate a distribution (pattern) of pixels based on a median of each component data, compare patterns of other component data; calculate a comparing value based on a component data having a predetermined center pixel; compare the comparing value with a dead pixel threshold; determine whether a pixel corresponding to the component data is the dead pixel; and output corrected component data; and output corrected component data;
wherein the dead pixel detecting unit comprises a first center value detecting unit configured to detect each of medians of the component data;
a first absolute value detecting unit, configured to detect an absolute value of a value of subtracting the median from each element of the component data;
a first comparing unit configured to calculate each absolute value of a value of subtracting a first output from a second output of the first absolute value detecting unit; -sum the absolute values; and detect-a comparing value per element of the component data;
a threshold setting-unit configured to set a threshold for an internal flag by using a threshold for an illumination classification and the median of the component data detected by the first median detecting unit; and
a first output determining unit configured to compare the comparing value, detected by the first comparing value detecting unit, with the dead pixel threshold and determining output data depending on whether there is the dead pixel.

9. The dead pixel processing device of claim 8, wherein the first output determining unit compares the comparing value, detected by the first comparing value detecting unit, with the dead pixel threshold and outputs the component data if there is no comparing value that is larger than the dead pixel threshold.

10. The dead pixel processing device of claim 8, wherein the first output determining unit compares the comparing value, detected by the first comparing value detecting unit, with the dead pixel threshold and determines each element of the component data if there is one comparing value threshold that is larger than the dead pixel threshold, and
the first output determining unit compares the absolute value of a value of subtracting adjacent elements from a particular element with the threshold, determined by the threshold determining unit and determines the particular element as the median of the adjacent elements if all of the absolute values are larger than the threshold.

11. The dead pixel processing device of claim 8, wherein the first output determining unit compares the comparing value, detected by the first comparing value detecting unit, with the dead pixel threshold and determines each element of the component data if there is one comparing value that is larger than the dead pixel threshold, and the first output determining unit compares the absolute value of a value of subtracting adjacent elements from a particular element with the threshold, determined by the threshold determining unit and determines the particular element as the output if there is no absolute value that is larger than the threshold.

12. The dead pixel processing device of one of claim 8, further comprising a hot pixel detecting unit configured to calculate the distribution (pattern) from the component data received from the dead pixel detecting unit, calculate a comparing value based on each component data; compare the comparing value with a hot pixel threshold; determine whether the corresponding pixel is the hot pixel; and output corrected component data.

13. The dead pixel processing device of claim 12, wherein the hot pixel detecting unit comprises a second center value detecting unit configured to detect each of the medians of the component data received from the dead pixel detecting unit;
  a second absolute value detecting configured to detect the absolute value of a value of subtracting the median, detected by the second median detecting unit, from each element of the component data;
  a second comparing unit configured to calculate each absolute value of a value of subtracting a first output from a second output of the second absolute value detecting unit; sum the absolute values; and detect a comparing value per element of the component data; and
  a second output determining unit configured to compare the comparing value, detected by the second comparing value detecting unit, with the hot pixel threshold and determine output data depending on whether there is the hot pixel.

14. The dead pixel processing device of claim 13, wherein the second output determining unit compares the comparing value, detected by the second comparing value detecting unit, with the hot pixel threshold and outputs the component data if there is no comparing value that is larger than the hot pixel threshold.

15. The dead pixel processing device of claim 13, wherein the second output determining unit compares the comparing value, detected by the second comparing value detecting unit, with the hot pixel threshold and determines each element of the component data if there is one comparing value threshold that is larger than the hot pixel threshold, and
  the second output determining unit compares the absolute value of a value of subtracting adjacent elements from a particular element with the threshold, determined by the threshold determining unit and determines the particular element as the median of the adjacent elements if all of the absolute values are larger than the threshold.

16. The dead pixel processing device of claim 13, wherein the second output determining unit compares the comparing value, detected by the second comparing value detecting unit, with the hot pixel threshold and determines each element of the component data if there is one comparing value threshold that is larger than the hot pixel threshold, and
  the second output determining unit compares the absolute value of a value of subtracting adjacent elements from a particular element with the threshold, determined by the threshold determining unit and determines the particular element as the output if there is no absolute value that is larger than the threshold.

* * * * *